United States Patent [19]

Ando

[11] Patent Number: 5,684,983
[45] Date of Patent: Nov. 4, 1997

[54] MICROPROCESSOR EXECUTING MULTIPLE REGISTER TRANSFER OPERATIONS WITH A SINGLE INSTRUCTION WITH DERIVATION OF DESTINATION REGISTER NUMBERS FROM SOURCE REGISTER

[75] Inventor: Hideki Ando, Hyogo, Japan

[73] Assignee: Mitsubishi Denki Kabushiki Kaisha, Tokyo, Japan

[21] Appl. No.: 384,975

[22] Filed: Feb. 7, 1995

[30] Foreign Application Priority Data

Feb. 7, 1994 [JP] Japan ................................. 6-013422

[51] Int. Cl.$^6$ ................................................. G06F 9/315
[52] U.S. Cl. ................................................. 395/566; 395/310
[58] Field of Search ............................... 395/375, 310, 395/800, 566

[56] References Cited

U.S. PATENT DOCUMENTS

| | | | |
|---|---|---|---|
| 5,269,007 | 12/1993 | Hanawa et al. | 395/375 |
| 5,303,354 | 4/1994 | Higuchi et al. | 395/310 |
| 5,509,129 | 4/1996 | Guttag et al. | 395/375 |
| 5,530,817 | 6/1996 | Masubuchi | 395/375 |

OTHER PUBLICATIONS

"An Efficient Resource–Constrained Global Scheduling Technique for Superscalar and VLIW Processors", Soo–Mook Moon et al., In Proc. 25th Annual International Symposium, Dec. 1992.

"Pathlength Reduction Features in the PA–RISC Architecture", by Ruby Lee et al., IEEE, Feb. 1992.

*Primary Examiner*—Parshotam S. Lall
*Assistant Examiner*—Gautam R. Patel
*Attorney, Agent, or Firm*—Lowe, Price, LeBlanc & Becker

[57] ABSTRACT

A microprocessor includes a register file that outputs data from multiple registers at one time, and that stores separate data to multiple registers at one time, and an instruction decoder for decoding an instruction to output an operation control signal. The instruction decoder decodes a specific data transfer instruction and outputs a multiple transfer control signal indicating data transfer from multiple registers to multiple registers, a source designating signal for designating multiple source registers, and a destination designating signal for designating destination registers. The register file responds to the source designating signal and outputs data from corresponding registers. The microprocessor further includes an ALU responsive to the control signal for carrying out an operation according to data stored in the register file to provide the result to a register in the register file. The ALU responds to the multiple transfer control signal and provides data read out from the source registers specified according to the source designating signal to the register file. The register file stores data provided from the ALU to the destination registers specified according to the respective destination designating signals. The instruction decoder provides the multiple transfer control signal, and the source and destination designating signals, whereby the ALU directly transfers data in the source registers specified according to the source designating signals to the destination registers specified according to the destination designating signals. Therefore, the transfer operation of a plurality of data can be executed at the same time.

4 Claims, 12 Drawing Sheets

```
L1:  i1: r1 = load r2 ; 2 CYCLES
     i2: nop;
     i3: r0 = r1 + r0 ; 1 CYCLE
     i4: if(cc!=0) goto L3 ; 1 CYCLE
L2:       . . .
          . . .
L3:  i5: r3 = r4 + r5 ; 1 CYCLE
     i6: r6 = r3 + r7 ; 1 CYCLE
     i7: r8 = r6 + r9 ; 1 CYCLE
```

```
L1:  i1: r1 = load r2 ; 2 CYCLES    i51: r10 = r4 + r5 ; 1 CYCLE
     i2:                             i61: r11 = r10 + r7 ; 1 CYCLE
     i3: r0 = r1 + r0 ; 1 CYCLE      i71: r12 = r11 + r9 ; 1 CYCLE
     i4: if(cc!=0) goto L3 ; 1 CYCLE
L2:       . . .
          . . .
L3:  i52: r3 = r10 ; 1 CYCLE        i62: r6 = r11 ; 1 CYCLE
     i72: r8 = r12 ; 1 CYCLE
```

```
L1:  i1: r0 = r2 - r1 ; 1 CYCLE
     i2: if(cc<0) goto L3 ; 1 CYCLE
L2:  i3: r4 = r2 ; 1 CYCLE
     i4: goto L4 ; 1 CYCLE
L3:  i5: r4 = r1 ; 1 CYCLE
L4:       . . .
```

FIG. 9
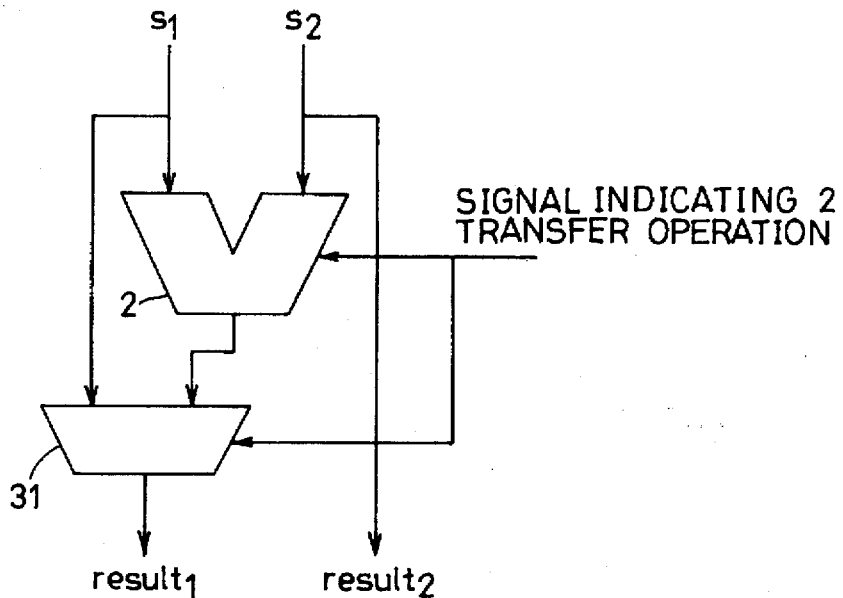
FIG. 10
$$\begin{cases} L_1: & i_1: r_1 = \text{load } r_2; 2 \text{ CYCLES} \quad i_{51}: r_{10} = r_4 + r_5; 1 \text{ CYCLE} \\ & i_2: \qquad\qquad\qquad\qquad\qquad\qquad i_{61}: r_{11} = r_{10} + r_7; 1 \text{ CYCLE} \\ & i_3: r_0 = r_1 + r_0; 1 \text{ CYCLE} \quad i_{71}: r_{12} = r_{11} + r_9; 1 \text{ CYCLE} \\ & i_4: \text{if}(cc!=0) \text{ goto } L_3; 1 \text{ CYCLE} \\ L_2: & \qquad \cdots \\ & \qquad \cdots \\ L_3; & i_{52-62}: (r_3 = r_{10}; r_6 = r_{11};) \quad i_{72}: r_8 = r_{12}; 1 \text{ CYCLE} \end{cases}$$
FIG. 11

$L_1$: $i_1$: $r_1$ = load $r_2$; 2 CYCLES  $i_{53}$: $r_{11}=r_4+r_5$; 1 CYCLE
$i_2$:                                      $i_{63}$: $r_{14}=r_{10}+r_7$; 1 CYCLE
$i_3$: $r_0 = r_1 + r_0$; 1 CYCLE           $i_{73}$: $r_{12}=r_{11}+r_9$; 1 CYCLE
$i_4$: if(cc!=0) goto $L_3$; CYCLE $L_2$:       . . .

. . .

$L_3$: $i_{54-64}$: ($r_3=r_{11}$; $r_6=r_{14}$;) $i_{74}$: $r_8=r_{12}$; 1 CYCLE

FIG.17

54 → | op | dst$_1$ | dst$_2$ | src$_1$ | src$_2$ | cond |

FIG.18 $\Big\{$ 
L$_1$: i$_1$: r$_0$=r$_2$-r$_1$; 1 CYCLE
      i$_9$: if(cc<0) r$_4$=r$_1$; else r$_4$=r$_2$; 1 CYCLE
L$_4$: . . .

FIG.20

55 → | op | dst | src$_1$ | src$_2$ | cond |

MICROPROCESSOR EXECUTING MULTIPLE REGISTER TRANSFER OPERATIONS WITH A SINGLE INSTRUCTION WITH DERIVATION OF DESTINATION REGISTER NUMBERS FROM SOURCE REGISTER

BACKGROUND OF THE INVENTION

1. Field of the Invention

The present invention relates to microprocessors, and more particularly, to a microprocessor that reads out instruction information from an address in a program memory specified by a program counter to decode the instruction information for executing an operation according to the instruction information.

2. Description of the Related Art

Referring to FIG. 1, a conventional microprocessor 100 executing one instruction in one cycle includes a register file 1 having a plurality of registers, an arithmetic logic unit (referred to as an ALU hereinafter) 2, an instruction register 3 for holding an instruction code, an instruction decoder 4 for decoding an instruction code, a program counter 5, a program memory 6, a register 7 for storing a condition code cc, a condition test circuit 8, an incrementor 10, and a selector 9.

Condition code cc includes a sign flag which is set when the operation result of ALU 2 is a negative value, and a zero flag that is set when the operation result of ALU 2 is 0.

When program counter 5 specifies an address in program memory 6, an instruction code of that address is read out from program memory 6. The instruction code read out from program memory 6 is held in instruction register 3. Instruction decoder 4 decodes the instruction code held in instruction register 3 to provide an operation signal to ALU 2 or the like.

When the instruction code held in instruction register 3 is an operation instruction, instruction decoder 4 provides signals sreg1 and sreg2 indicating two registers holding the values used in the operation in ALU 2 to register file 1. Register file 1 provides values S1 and S2 of the two registers to ALU 2. Instruction decoder 4 also causes a predetermined operation to be carried out in ALU 2. Instruction decoder 4 also provides a signal dreg to register file 1 indicating the register number to which the operation result "result" of ALU 2 is to be written. ALU 2 provides the operation result "result" to register file 1. Register file 1 writes the operation result "result" to that register.

When the instruction held in instruction register 3 is a branch instruction, instruction decoder 4 provides a signal indicating a branch condition to branch test circuit 8. A branch condition is, for example, whether the operation result of ALU 2 is not 0, or whether the operation result of ALU 2 is a negative number, etc.

Condition test circuit 8 compares the condition provided from instruction decoder 4 with condition code cc stored in register 7 to test whether a branch condition is met or not. When the condition is met, a destination address provided from instruction decoder 4 is written into program counter 5 by selector 9. When a branch condition is not met, the current program counter value plus 1 is written into program counter 5 by incrementor 10 and selector 9.

Such an instruction is externally applied in a symbolic language. For example, an addition instruction of adding the contents of the first register r1 to the contents of the second register r2 and storing the added result into the third register r3 is expressed by the language "r3=r1+r2". The transfer operation of transferring the contents of the first register r1 to the second register r2 is expressed by the language "r2=r1+r0" using an addition instruction. It is to be noted that the 0th register r0 is a particular register dedicated for read out only, and stores 0. The instruction of a transfer operation is normally abbreviated as "r2=r1". A program includes a predetermined sequence of these instructions for achieving one object.

An instruction in the symbolic language is converted into machine language to be stored as an instruction code in a predetermined address in program memory 6. In the case of the above-described addition instruction, an instruction code 56 is formed of four portions called fields as shown in FIG. 2. These four fields include a field op, a field dst, a field src1 and a field src2.

Field op stores a code for specifying an operation to be carried out in ALU 2. According to the above-described instruction of transfer operation, field op stores a code representing addition.

Field dst stores a code representing the number of the register for storing the operation result of ALU 2. For the instruction of the above-described transfer operation, field dst stores a code representing "2".

Fields src1 and src2 store codes representing the number of the registers used in the operation in ALU 2. For the instruction of the above-described transfer operation, fields src1 and src2 store codes representing 1 and 0, respectively.

A microprocessor is considered having a structure similar to that of microprocessor 100 of FIG. 1, provided that another ALU 2 is included. The contents of four registers can be read out at one time from register file 1, and data can be written simultaneously into two registers. It is assumed that this microprocessor can execute an operation instruction in one cycle, a load instruction in two cycles, and a branch instruction in one cycle, and that any two instructions can be executed simultaneously out of two operation instructions, one load instruction, and one branch instruction.

FIG. 3 shows a program executed by such a microprocessor. This program includes seven instructions i1–i7. Instructions i1 and i5 are labeled with L1 and L3, respectively. The instructions of the portion labeled with L2 are omitted in FIG. 3.

Instruction i1 is "r1=load r2". Instruction i1 is a load instruction to access a data memory (not shown) with the contents of the second register r2 as the address, whereby data stored in that address is stored into the first register r1.

Instruction i2 is "nop", representing an instruction that no operation should be executed. Since it is assumed that this microprocessor executes a load instruction in two cycles, it is necessary to insert this nop instruction here because other instructions cannot be executed during this cycle.

Instruction i3 is "r0=r1+r0". Instruction i3 indicates that the value in the first register is added with value 0 stored in register r0. By this instruction, condition code cc is set by the value of register r1 itself.

Instruction i4 is "if(cc!=0) goto L3". Instruction i4 indicates a branch instruction. The control of the program proceeds to L3 when a zero flag is set in condition code cc, otherwise proceeds to L2. More specifically, the control of the program proceeds to L3 when the value of the first register r1 is not 0. When the value of the first register r1 is 0, the program control proceeds to L2. The expression of "A!=B" represents "A and B are not equal".

Instruction i5 is "r3=r4+r5". This instruction indicates addition, wherein the contents of the fourth and fifth registers r4 and r5 are added to be stored in the third register r3. "r6=r3+r7" of instruction i6 and "r8=r6+r9" of instruction i7 are similar to instruction i5.

In the execution of the program shown in FIG. 3, the number of cycles required for execution is 7 when the program control proceeds to L3 by instruction i4.

According to the above-described embodiment, the present microprocessor is capable of executing two instructions in parallel. However, in the execution of the program shown in FIG. 3, instructions can be executed only serially. The processing capability of the hardware of the microprocessor is not sufficiently effected.

The reason why instructions must be executed serially is set forth in the following. Since the contents of the first register r1 which is the execution result of instruction i1 is used by instruction i3, instruction i3 cannot initiate execution until the execution of instruction i1 is completed. Since instruction i4 uses the result of instruction i3, instruction i3 and i4 must be executed serially. Similarly, since the execution result of instruction i5 is used by instruction i6, and the execution result of instruction i6 is used by instruction i7, instructions i5, i6, and i7 must be executed serially.

The above-described dependency between registers does not exist between instructions i1, i3, i4 and instructions i5, i6, i7. However, instructions i5, i6, and i7 cannot be executed parallel to instructions i1 and i3 because execution thereof cannot be identified until the branch direction is determined by instruction i4. If execution is carried out prior to determination of the branching direction by instruction i4, the values of registers r3, r6 and r8 will be replaced by the operation results. Then, upon execution of instruction i4, the program control may proceed to L2. If those registers are referred to according to execution of the instruction leading to L2, the correct result cannot be obtained.

Instructions i1, i3 and i4 and instructions i5, i6 and i7 cannot be executed at the same time due to the above-described reason. However, these instructions can be executed at the same time by modifying the write registers of instructions i5, i6 and i7 to those that will not be referred to even when the program control proceeds to L2. In practice, the values of these registers are to be transferred to the original registers where the results are to be held when the program control proceeds to L3. This method is called "register renaming".

FIG. 4 shows a program where register renaming is used. This program includes ten instructions i1, i51; i2, i61; i3, i71; i4; i52, i62; and i72. When the program control proceeds to L3 by instruction i4, the program is executed in six cycles. It is appreciated from FIG. 4 that instructions i1 and i51, and instructions i52 and i62 are labeled as L1 and L3, respectively. The instructions labeled L2 to L3 are not shown in FIG. 4.

Instructions i1, i2, i3, i4, i52, and i72 are executed by one of the two assumed ALUs 2. Instructions i51, i61, i71, and i62 are executed by the other ALU 2. The description of instructions i1–i4 are not repeated since they are identical to the corresponding instruction in the program of FIG. 3.

Instruction i51 executed at a cycle identical to that of instruction i1 is "r10=r4+r5". Instruction i51 causes the added results of the fourth and fifth registers r4 and r5 to be stored in the tenth register r10.

Instruction i61 executed at a cycle identical to that of instruction i2 is "r11=r10+r7". Instruction i61 causes the added results of the tenth and seventh registers r10 and r7 to be stored in the eleventh register r11.

Instruction i71 executed at a cycle identical to that of instruction i3 is "r12=r11+r9". Instruction i71 causes the added results of the eleventh and ninth registers r11 and r9 to be stored in the twelfth register r12.

Instruction i52 is "r3=r10". Instruction i52 causes the contents of the tenth register r10 to be transferred to the third register r3.

Instruction i62 executed at a cycle identical to that of instruction i52 is "r6=r11". Instruction i62 causes the contents of the eleventh register r11 to be transferred to the sixth register r6.

Instruction i72 is "r8=r12". Instruction i72 causes the contents of the twelfth register r12 to be transferred to the eighth register r8.

Here, it is assumed that registers r10, r11 and r12 are not referred to in paragraphs L2, L3 et seq. in the program.

In this program, instead of instruction i5 of the program of FIG. 3, an operation is carried out by instruction i51 of the first cycle, whereby the result is written into register r10. Since register r10 is not referred to by the program after L2, execution of the program is not affected even when the program control proceeds to L2.

When the program control proceeds to L3, the result of register r10 should originally exist in register r3. Therefore, the contents of register r10 is transferred to r3 by instruction i52. A similar operation is carried out by instructions i6 and i7. In the present program, the number of cycles required when the program control proceeds to L3 is 6, which is one cycle shorter than that of the program of FIG. 3.

Referring to FIG. 5, another program that is executed by the above microprocessor under the assumption that two instructions can be executed in parallel includes 5 cycles of instructions i1–i5. Instructions i1, i3 and i5 are labeled L1, L2, and L3, respectively. The instruction labeled L1 is not shown in FIG. 5. Instruction i1 is "r0=r2–r1". Instruction i1 causes the contents of the first register r1 to be subtracted from the contents of the second register r2, whereby condition code cc is set according to the result thereof.

Instruction i2 is "if(cc<0) goto L3". Instruction i2 represents a branch instruction. When a sign flag is set in condition code cc, the program control proceeds to L3, otherwise to L2. More specifically, when instruction i2 is executed, the program control proceeds to L3 if the contents of the first register r1 is greater than that of the second register r2, otherwise to L2.

Instruction i3 is "r4=r2". Instruction i3 causes the contents of the second register r2 to be transferred to the fourth register r4.

Instruction i4 is "goto L4". This causes the program control to proceed to L4.

Instruction i5 is "r4=r1". This causes the contents of the first register r1 to be transferred to the fourth register r4.

This program causes the greater value of the first and second registers r1 and r2 to be stored in the fourth register r4. The microprocessor has to execute the instructions serially even in the case of this program. The capability of the microprocessor executing two instructions in parallel is not effected.

If two transfer operations, for example instructions i52 and i62, in the program of FIG. 4, can be executed simultaneously in ALU 2, the three instructions i52, i62, and i72 can be executed in one cycle. If two transfer operations can be selected and executed by instructions i3 and i5 according to the condition of (cc<0), four instructions i2–i5 can be executed in one cycle in the program of FIG. 5. Thus, a microprocessor that can effectively execute a program is desired.

SUMMARY OF THE INVENTION

In view of the foregoing, an object of the present invention is to provide a microprocessor that can effectively execute a program including a transfer operation instruction.

Another object of the present invention is to provide a microprocessor that can execute a plurality of transfer operation instructions at the same time.

A further object of the present invention is to provide a microprocessor that can select and execute one of a plurality of transfer operations depending upon a condition.

A microprocessor according to the present invention includes a register file having a plurality of registers that can output data from a plurality of registers at one time and that can store separate data at one time into a plurality of registers, and an instruction decode device for decoding an instruction information to output a control signal for controlling execution of an operation. The instruction decode device decodes a specific data transfer instruction and provides a multiple transfer control signal for indicating the transfer of data from a plurality of registers to another plurality of registers, source designating signals for designating a plurality of source registers, and destination designating signals for designating corresponding destination registers as a portion of a control signal. The register file responds to the source designating signals to provide data from the corresponding plurality of registers. The microprocessor further includes an operation device responsive to a control signal for executing an operation according to data stored in the register file to provide the result into a register in the register file. The operation device responds to the multiple transfer control signal and provides data read out from the plurality of source registers according to the source designating signals into the register file. The register file stores the data from the operation device into the plurality of destination registers according to the respective destination designating signals.

In this microprocessor, the instruction decode device provides the multiple transfer control signal and the plurality of source and destination designating signals. In response, the operation device transfers the data of the plurality of source registers according to the plurality of source designating signals to the plurality of destination registers according to the plurality of destination designating signals. Therefore, the transfer operation of a plurality of data can be executed at the same time.

According to another aspect of the present invention, a microprocessor includes a register file having a plurality of registers that can output data from a plurality of registers of the designated number at one time and that can store data into the registers of the designated number, and an instruction decode device for decoding an instruction information to provide a control signal to control operation execution. The instruction decode device decodes a specific data transfer instruction and provides a transfer control signal for designating data transfer from one of a plurality of source registers to a destination register, a source designating signals for designating a plurality of source registers, and a destination designating signal for designating a destination register, and a transfer condition signal for designating a condition determining the manner of data transfer as a portion of a control signal. The register file responds to the source designating signals and outputs data from corresponding plurality of registers. The microprocessor further includes an operation device responsive to a control signal for executing an operation according to data stored in the register file to provide the result into a register in the register file, and for providing a condition code of operation execution, and a condition determination device to compare a condition code output from the operation device with a transfer condition signal for making determination whether a condition defining the manner of data transfer is met or not to generate a condition establish signal. The operation device responds to the transfer control signal and the condition establish signal to select and provide to the register file one data read out from the plurality of source registers according to the source designating signal. The register file stores the data provided from the operation device into a destination register according to the destination designating signal.

According to this microprocessor, the instruction decode device provides a transfer control signal, source designating signals and a destination designating signal, and a transfer condition signal. The condition determination device compares a condition code output from the operation device with the transfer condition signal for making determination whether a condition defining the manner of data transfer is met or not to generate a condition establish signal. In response, the operation signal selects a source designating signal and a destination designating signal which match the condition to transfer the data in the source register specified according to the source designating signal to the destination register specified according to the destination designating signal. Thus, one of a plurality of transfer operations can be selected and executed.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 9 is a block diagram showing another structure of an ALU of the microprocessor of FIG. 6.

FIG. 10 shows an example of a program executed by a microprocessor assumed to have a structure similar to that of the microprocessor of FIG. 6 and that can execute two instructions in parallel.

FIG. 11 shows a structure of an instruction code of a microprocessor according to a first modification of the first embodiment.

FIG. 17 shows a structure of an instruction code of the microprocessor of FIG. 16.

FIG. 18 shows an example of a program including an instruction corresponding to the instruction code shown in FIG. 17.

FIG. 20 shows a field structure of an instruction code of the microprocessor of FIG. 19.

DETAILED DESCRIPTION OF THE PREFERRED EMBODIMENTS

Embodiment 1

Figure 6:
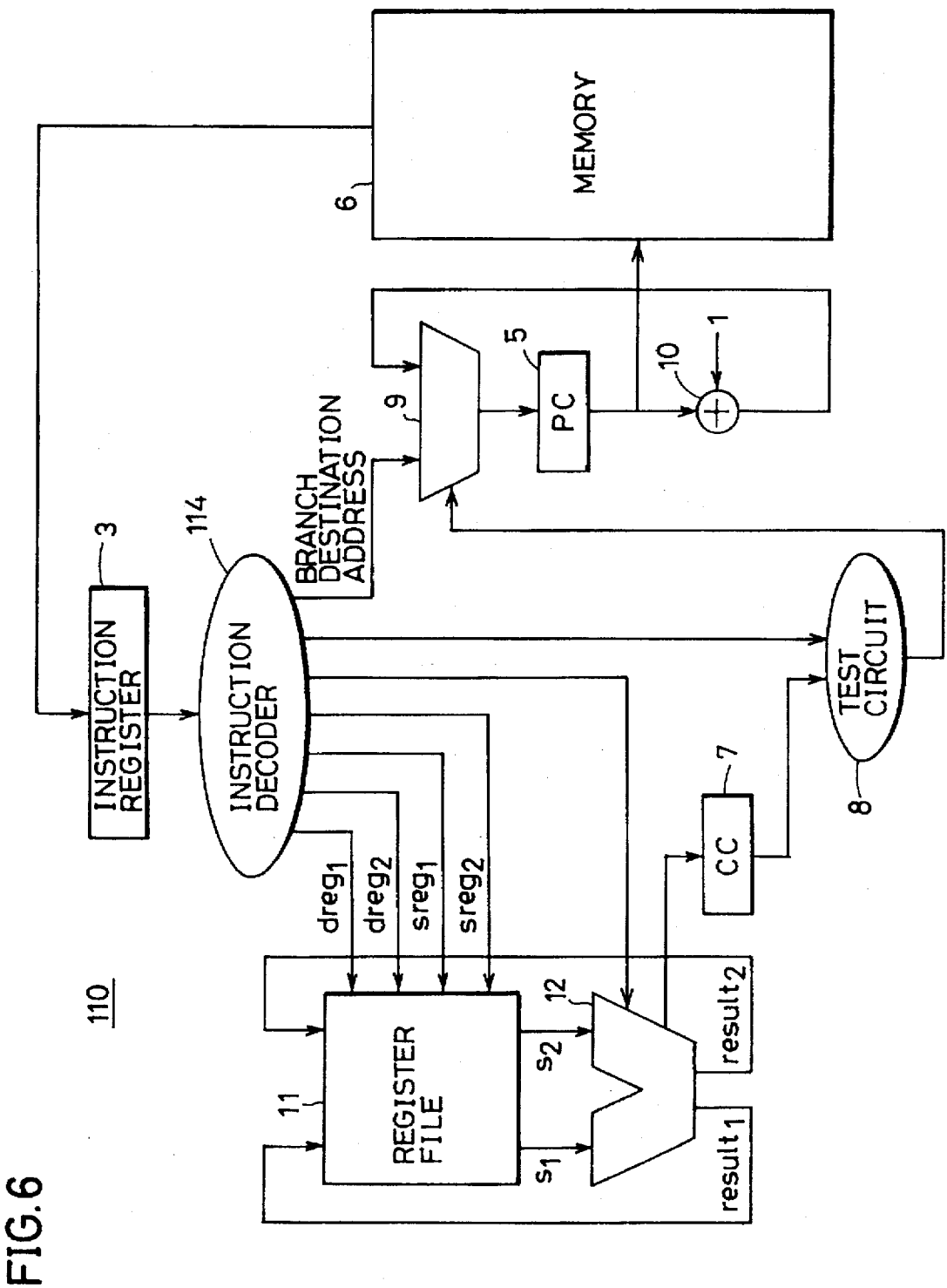
FIG. 6 is a block diagram showing a hardware structure of a microprocessor according to an embodiment of the present invention.

FIG. 6 is a block diagram showing a hardware structure of a microprocessor 110 according to an embodiment of the present invention. Microprocessor 110 includes an ALU 12 having two inputs s1 and s2 and two outputs result1 and result2, a register file 11, an instruction decoder 114, an instruction register 3, a register 7 for storing condition code cc, a condition test circuit 8, a selector 9, a program counter 5, and an incrementor 10. The output of program counter 5 is provided to memory 6.

Result1 is similar to an output of a conventional ALU 2. Result2 is simply s2 which is one of the inputs. Register file 11 can output values S1 and S2 of two registers at one time. Register file 11 can also write data into two registers at one time.

Instruction decoder 114 provides two signals sreg1 and sreg2 indicating two source registers and two signals dreg1 and dreg2 indicating two destination registers to register file 11.

Figure 1:
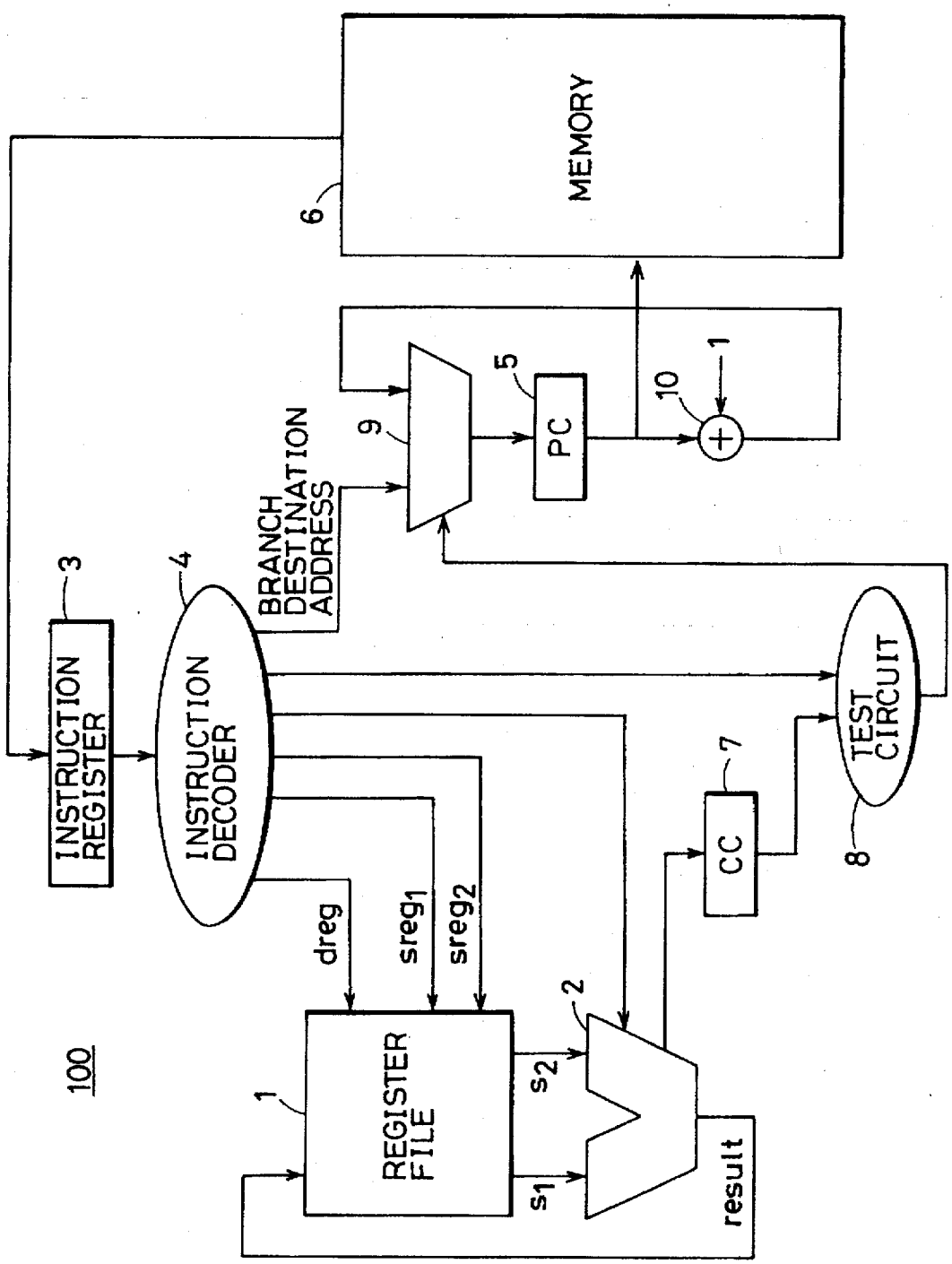
FIG. 1 is a block diagram showing a hardware structure of a conventional microprocessor.

The remaining structure of the microprocessor of FIG. 6 is similar to that of the conventional microprocessor 100 of FIG. 1. Corresponding components have same reference characters denoted, and detailed description thereof will not be repeated here.

Figure 7:
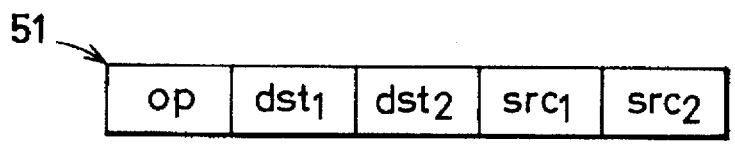
FIG. 7 shows a structure of an instruction code of the microprocessor of FIG. 6.

Microprocessor 110 can execute two transfer operations at one time. An instruction code 51 for executing two transfer operations includes five fields op, dst1, dst2, src1 and src2 as shown in FIG. 7.

When two transfer operations r2=r1 and r4=r3, for example, are to be executed simultaneously by the microprocessor, a specific code representing two transfer operations is stored in field op. When this particular code is present in field op of the instruction, instruction decoder 4 sets "a signal indicating two transfer operations" which is the output thereof to 1. Codes representing the numbers of the destination registers, i.e., 2 and 4, are stored into fields dst1 and dst2. In fields src1 and src2, codes of the numbers of the source registers, i.e., 1 and 3, are stored.

Figure 8:
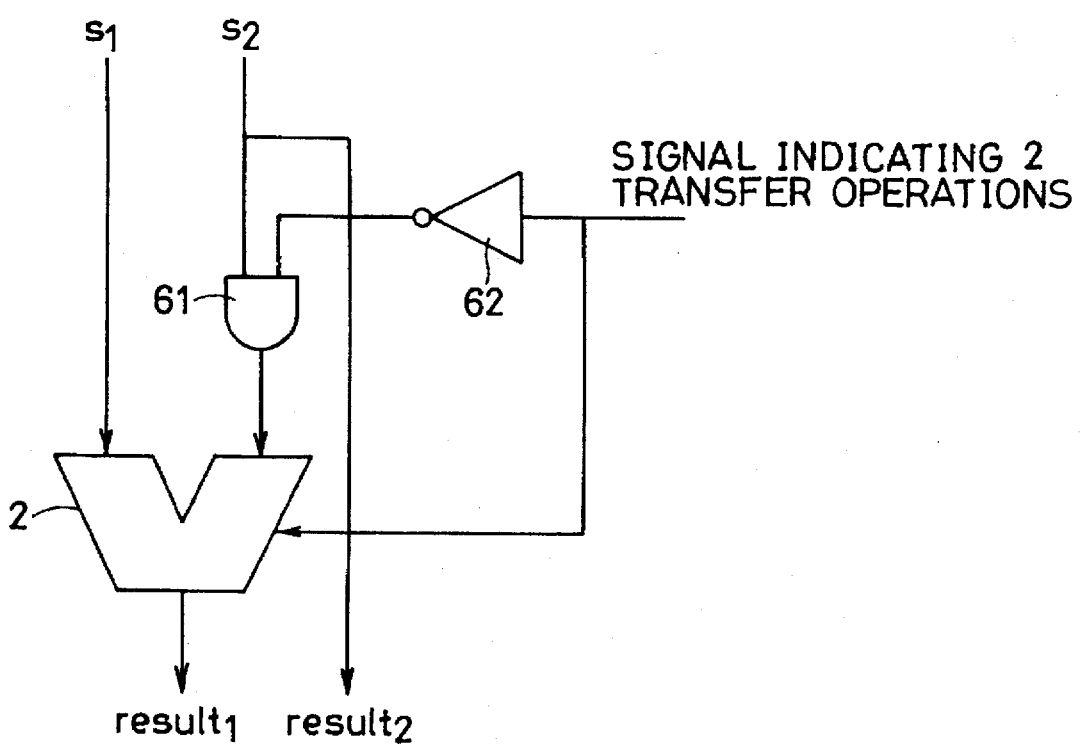
FIG. 8 is a block diagram showing a structure of an ALU of the microprocessor of FIG. 6.

Referring to FIG. 8, ALU 12 of microprocessor 110 of FIG. 6 includes an ALU 2 identical to that of the conventional microprocessor 100 of FIG. 1, as well as an AND gate 61, and an inverter gate 62.

In FIG. 8, data s1 from one source register is applied to one input of ALU 2. Data s2 of the other source register is directly output from ALU 12 as result2, and also applied to one input node of AND gate 61. The "signal indicating two transfer operations" from instruction decoder 4 is applied to ALU 2, as well as to the other input node of AND gate 61 via inverter gate 62. The output of AND gate 61 is applied to ALU 2. ALU 2 outputs result1.

When "the signal indicating two transfer operations" becomes 1, the output of inverter gate 62 and AND gate become 0. ALU 2 responds to "the signal indicating two transfer operations" to add two inputs s1 and s2 which are output. Therefore, s1 is directly output as result1, and s2 is directly output as result2.

Referring to FIG. 6 again, in operation, when the aforementioned specific code is stored in field op, instruction decoder 114 provides signals sreg1 and sreg2 indicating two source registers to register file 11, whereby values s1 and s2 of those registers are provided to ALU 12. Instruction decoder 4 causes "the signal indicating two transfer operations" provided to ALU 12 to 1. Values s1 and s2 applied to register file 11 are directly output from ALU 12 as result1 and result2. Instruction decoder 4 provides signals dreg1 and dreg2 indicating the destination registers of result1 and result2 from ALU 12 to register file 11, whereby result1 and result2 are written into those registers.

Referring to FIG. 9, an ALU 12a which is another example of ALU 12 of microprocessor 110 of FIG. 6 can replace ALU 12 in FIG. 6. ALU 12a includes ALU 2 of the conventional microprocessor 100 of FIG. 1, and a selector 31.

ALU 2 receives data s1 and s2 from two source registers to carry out an operation according to an operation signal from instruction decoder 114 and provides the result. Selector 31 receives data s1 from one source register and the output of ALU 2. Selector 31 provides as result1 the output of ALU 2 and data s1 from one source register when "the signal indicating two transfer operations" is 0 and 1, respectively. The operation carried out by ALU 2 when "the signal indicating two transfer operations" becomes 1 is arbitrary. This is because the result thereof is not used.

Data s2 from the other source register is directly output from ALU 12a as result2. Therefore, when "the signal indicating two transfer operations" takes a value of 1, S1 is directly output from ALU 12a as result1, and S2 is directly output from ALU 12a as result2. When "the signal indicating two transfer operations" takes a value of 0, the output of ALU 2 is output from ALU 12a as result1, and S2 is output from ALU 12a as result2.

Next, a microprocessor is assumed having a structure similar to that of microprocessor 110 of FIG. 6 and that has two ALU 12. It is assumed that this microprocessor can read out the contents of four registers from register file 11 and write into four registers. It is also assumed that this microprocessor can execute an operation instruction in one cycle, a load instruction in two cycles, a branch instruction in one cycle, and that any two instructions can be executed at the same time out of two operation instructions, one load instruction, and one branch instruction.

FIG. 10 shows a program executed by such a microprocessor. This program includes nine instructions i1, i51; i2, i61; i3, i71; i4; i52–62, i72, which are executed in five cycles. Instructions i1, i2, i3, i4, and i52–62 are executed by one of the two ALUs 12, and instructions i51, i61, i71, and i72 are executed by the other ALU 12. Instructions i1, i51, i2, i61; i3, i71; i4 are similar to those of the program shown in FIG. 4, and their description will not be repeated here.

"R3=r10; r6=r11" of instruction i52–62 represents one instruction that executes two transfer operations at one time. More specifically, this causes the contents of the tenth register r10 to be transferred to the third register r3, in parallel to the contents of the eleventh register r11 to be transferred to the sixth register r6. Instruction i52–62 and instruction i72 can be executed at the same time in one cycle. Therefore, the number of cycles executed by this program is reduced by 1 cycle compared to that of the program of FIG. 4.

According to microprocessor 110 of the present embodiment, instruction decoder 114 outputs the "signal indicating two transfer operations", signals sreg1 and sreg2 indicating two source registers, and signals dreg1 and dreg2 indicating two destination registers. Register file 11 outputs values s1 and s2 of the registers according to signals sreg1 and sreg2. ALU 2 directly outputs s1 and s2 as result1 and result2, respectively. Register file 11 writes result1 and result2 into the registers specified by signals dreg1 and dreg2. Therefore, two transfer operations can be executed simultaneously by one ALU 12.

Figures 2, 3, 4, 5:
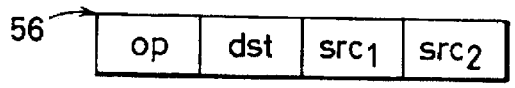
FIG. 2 schematically shows a structure of an instruction executed by the microprocessor of FIG. 1.
FIG. 3 shows an example of a program executed by a microprocessor assumed to have a structure similar to that of the microprocessor of FIG. 1 and that can execute two instructions in parallel.
FIG. 4 shows an example of a program using register renaming executed by a microprocessor assumed to have a structure similar to that of the microprocessor of FIG. 1 and that can execute two instructions in parallel.
FIG. 5 shows an example of another program of a microprocessor assumed to have a structure similar to that of the microprocessor of FIG. 1 and that can execute two instructions in parallel.

By assuming a microprocessor including two ALUs 12 that can read out the contents of four registers from register file 11 and that can write into four registers, the three instructions i52, i62 and i72 of the program of FIG. 4 can be executed in one cycle. Therefore, register renaming becomes effective.

Embodiment 2

In Embodiment 1, designation of the destination register is carried out within instruction code 51. Therefore, there was the problem that the number of fields of instruction code 51 of FIG. 7 has one more field in comparison with the number of fields of conventional instruction code 56 shown in FIG. 2. In order to eliminate this problem, two transfer operations are to be carried out according to the following rule in the second embodiment. More specifically, data transfer from registers rx and ry is limited to the destinations of a register rf (x, m) and a register rf (y, m), respectively. Here, $f$ is a function defined by the hardware, and m is a constant specified by an instruction code.

Instruction code 52 includes four fields op, modifier, src1 and src2, as shown in FIG. 11. A specific code representing two transfer operations is stored in field op. A code representing the aforementioned constant m is stored in the modifier field. A code representing the number of the register used in the operation of ALU 12 is stored in fields src1 and src2. When function $f$ is an exclusive OR operation, constant m is set to 8 in order to transfer the contents of register r2 to register r10. In this case, the register that can be used in the transfer operation that are carried out at the same time is limited. For example, the contents of register r5 can be transferred only to register r13. This is because the following is established:

$$f(x, m) = f(2, 8)$$
$$= 2 \oplus 8$$
$$= (0010)_B \oplus (1000)_B$$
$$= (1010)_B$$
$$= 10$$

-continued
$$f(x, m) = f(5, 8)$$
$$= 5 \oplus 8$$
$$= (0101)_B \oplus (1000)_B$$
$$= 1101$$
$$= 13$$

where "$\oplus$" indicates an exclusive OR operation, and "$()_B$" represents a binary notation.

In register renaming the register which is to be written with the result of the transfer instruction is modified so as to comply with this rule. For example, function $f$ is set as an exclusive OR operation, similar to the above embodiment, and instructions i5 and i6 are to be executed prior to a branch information in the program of FIG. 3. In this case, constant m is selected so that registers rx and ry are both empty registers (a register that will not be referred to regardless of the program control proceeding to L2 or L3) for x and y satisfying the following equations (1) and (2).

$$x \oplus m = 3 \qquad (1)$$

$$y \oplus m = 6 \qquad (2)$$

For example, x=11, y=14, and m=8 satisfy the above equations (1) and (2). If registers r11 and r14 are empty registers, r11 and r14 can be used as the renaming registers for r3 and r6.

Figures 12, 13:
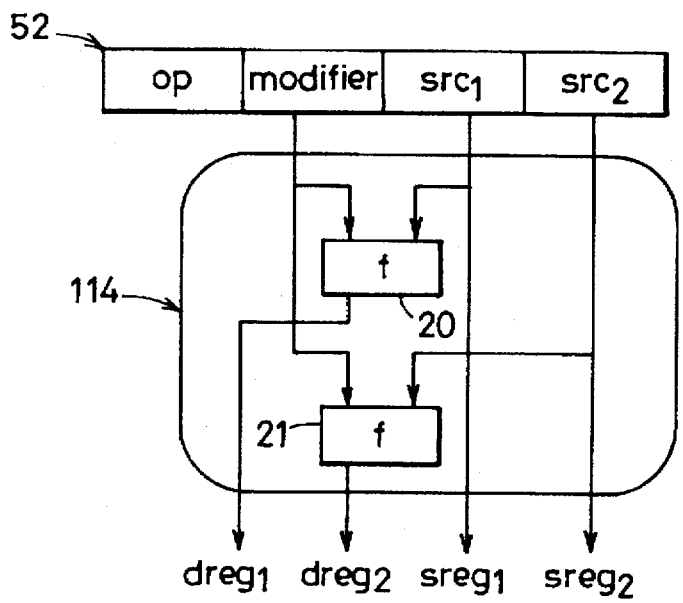
FIG. 12 shows a program including an instruction corresponding to the instruction code shown in FIG. 11.
FIG. 13 shows a structure of an instruction decoder for decoding the instruction code of FIG. 11.

FIG. 12 shows a program for executing a plurality of instructions including the above-described transfer operation instruction. This program includes nine instructions i1, i53; i2, i63; i3, i73; i4; i54–64, i74 which are executed in five cycles. All the instructions other than i53, i63, and i54–64 are similar to those of the program shown in FIG. 10, and their detailed description will not be repeated here.

In instruction i53, the added result of the contents of registers r4 and r5 are stored in register r11 which is determined in advance as a renaming register. In instruction i63, the added result of the contents of registers r10 and r7 is stored in register r14 which is determined in advance as a renaming register. In instruction i54–64, the contents of register r11 is transferred to register r3, and the contents of register r14 is transferred to register r6. It is to be noted that the numbers "3" and "6" of registers "r3" and "r6" are values calculated from the numbers "11" and "14" of registers "r11" and "r14".

FIG. 13 is a block diagram showing a structure of instruction decoder 4 carrying out the above-described operation. Instruction decoder 4 includes two operation units 20 and 21.

Operation unit 20 executes an operation of dreg1=$f$(src1, m). More specifically, operation unit 20 receives a code representing a constant m (in the above-described embodiment, 8) from the modifier region of instruction code 52, and a code representing the register number (in the above-described embodiment, 11) of the source register from the src1 region. Operation unit 20 takes the exclusive OR operation of these two inputs to provide a signal dreg1 indicating the register number (in the above-described embodiment, the register having a register number of "3") of the destination register.

Operation unit 21 executes an operation of dreg2=$f$(src2, m). Operation unit 21 receives a code representing a constant m from the modifier region of instruction code 52, and a code representing the register number (in the above embodiment, 14) of the source register from the src1 region. Operation unit 21 applies an exclusive OR on the two inputs to provide a signal dreg2 indicating the destination register (in the above embodiment, the register having a register number of "6").

The codes in fields src1 and src2 representing the register numbers of the source registers are directly output as in the conventional case, to result in signals sreg1 and sreg2 indicating the source registers (in the above embodiment, registers having the register number of "11" and "14").

In the present embodiment, signals sreg1 and sreg2 indicating the numbers of the source registers and signals dreg1 and dreg2 indicating the numbers of the destination registers are calculated according to the code representing the number of the source register and the code representing the constant m. Therefore, according to the present embodiment, execution of two transfer operations can be specified by one instruction with instruction code 52 having a number of fields identical to those of a conventional instruction code 56.

In the present embodiment, signals dreg1 and dreg2 indicating destination registers are calculated from the code representing the register number of the source register and constant m. The present invention is not limited to this embodiment, and signals sreg1 and sreg2 indicating source registers may be calculated from the code representing the register number of the destination register and constant m. The instruction code of such a case is set forth in the following.

Figure 14:
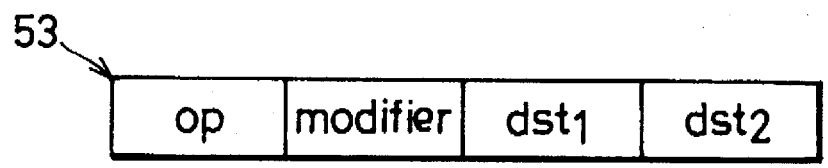
FIG. 14 shows a structure of an instruction code of a microprocessor according to a second modification of the first embodiment.

Referring to FIG. 14, an instruction code 53 of this case includes four fields op, modifier, dst1 and dst2. A specific code representing a multiple transfer operation is stored in field op. A code representing a value of constant m is stored in the modifier field. A code representing the register number of the destination register is stored in fields dst1 and dst2.

Figure 15:
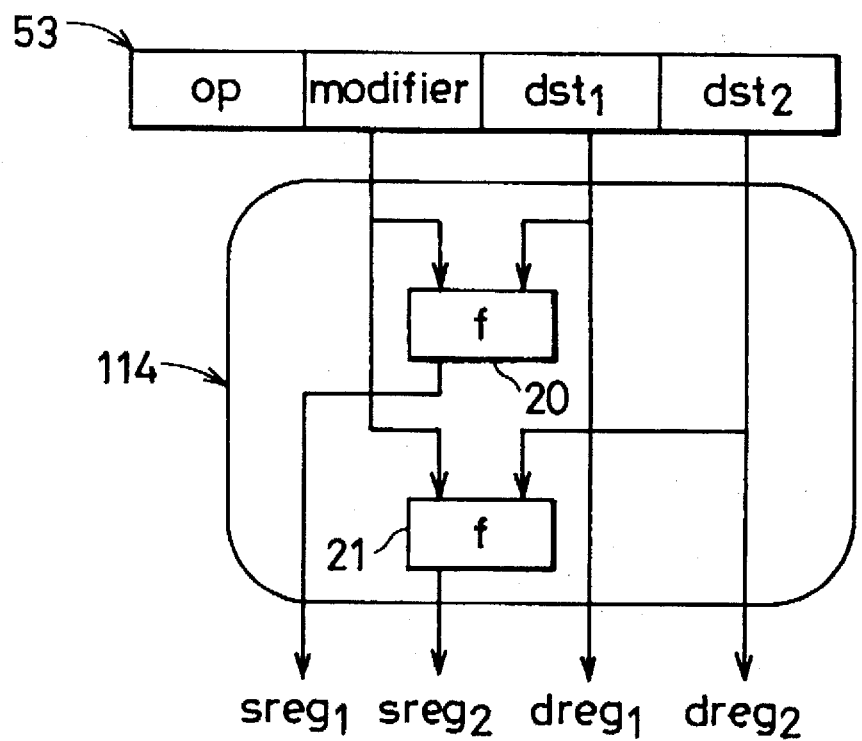
FIG. 15 shows a structure of an instruction decoder for decoding the instruction code of FIG. 14.

Referring to FIG. 15, operation unit 20 of decoder 114 carries out an operation on the contents of the modifier field and the dst1 field of instruction code 53. This value is decoded to be output as signal sreg1 indicating a source register. Operation unit 21 carries out an operation on the contents of the modifier field and the dst2 field in instruction code 53. The value is decoded to be output as signal sreg2 indicating a source register. The contents of fields dst1 and dst2 become signals dreg1 and dreg2 indicating the destination registers.

Embodiment 3

Figure 16:
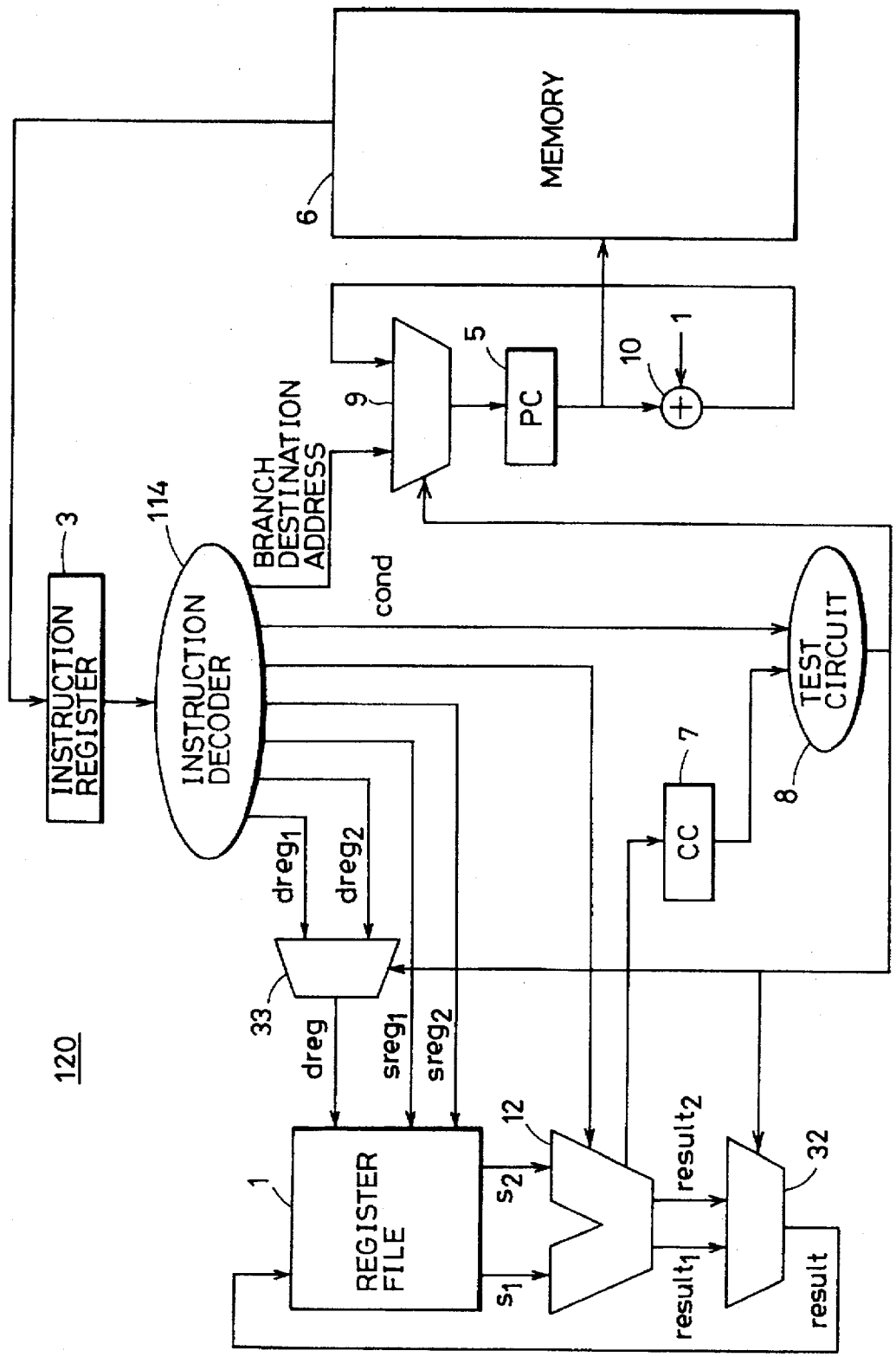
FIG. 16 shows a hardware structure of a microprocessor according to a second embodiment of the present invention.

Referring to FIG. 16, a microprocessor 120 according to a third embodiment of the present invention is similar to microprocessor 110 of FIG. 6, except that two selectors 32 and 33 are added. Furthermore, register file 11 of FIG. 6 is replaced with register file 1 of FIG. 3. In FIGS. 16 and 6, the same components have the same reference characters and labels denoted. The function is also identical. Therefore, their description will not be repeated here.

Selector 33 responds to an output of condition test circuit 8 to select either signal dreg1 or dreg2 indicating two destination registers. The selected result dreg is output to register file 1. Selector 32 responds to an output of condition test circuit 8 to select one of two outputs result1 and result2 of ALU 12. The selected result is output to register file 1.

The provision of selector 33 allows a register file to be used that is identical to a conventional microprocessor 100 shown in FIG. 1.

Referring to FIG. 17, instruction code 54 of microprocessor 120 has a field cond added to instruction code 51 of FIG. 7. More specifically, instruction code 54 includes fields op, dst1, dst2, src1, src2, and cond.

A specific code is stored in field op representing an instruction for specifying whether a transfer operation is to be carried out or not on the basis of whether a condition is met or not. A code representing the register number of a destination register is stored into fields dst1 and dst2. A code representing the register number of a source register is stored respectively into fields src1 and src2. A code representing the condition (!=0, <0 etc.) is entered into field cond.

When condition code cc is referred to and the condition represented by the code in field cond is met, the contents of the register represented by the code of field src1 is transferred to the register represented by the code field dst1. When the condition is not met, the contents in the register represented by the code in field src2 is transferred to the register represented by the code in field dst2.

More specifically, when an instruction is executed that carries out a transfer operation according to a condition, the contents of condition cc is referred to, whereby condition test circuit 8 evaluates whether the condition represented by the code in field cond is established. When the evaluated result is true, selectors 32 and 33 select and output result1 and dreg1, respectively. This causes the contents of the register represented by the code of field src1 to be transferred to the register represented by the code in field dst1, and the contents of the register represented by the code of field src1 is not transferred to the register represented by the code of field dst2.

In contrast, when the evaluated result of condition test circuit 8 is false, selectors 32 and 33 select and output result2 and dreg2, respectively. This causes the contents of the register represented by the code of field src2 to be transferred to the register represented by the code in field dst2, and the contents of the register represented by the code of field src1 is not transferred to the register represented by field dst1.

Refer again to FIG. 5 showing the program that compares the contents of registers r1 and r2 to store the greater one into register r4. This program can be rewritten as shown in FIG. 18 when the present method is used.

Referring to FIG. 18, this program includes two instructions i1 and i9 which are executed in two cycles. Instruction i1 is labeled L1. The instruction labeled L4 is not shown in FIG. 18. Instruction i1 is identical to that in the program shown in FIG. 5.

Instruction i9 is "if(cc<0) r4=r1; else r4=r2". This causes the contents of first register r1 to be transferred to the fourth register r4 when the sign flag of condition code cc is set, otherwise the contents of the second register r2 is transferred to the fourth register r4. This program can be executed in two cycles which is 1–2 cycles shorter than the number of execution cycles of the program of FIG. 5.

In microprocessor 120 of the present embodiment, instruction code 54 includes a code representing an instruction carrying out a transfer operation according to an condition, codes representing the numbers of two pairs of source and destination registers, and a code representing a condition. Accordingly, instruction decoder 114 causes one source register and one destination register to be selected according to the condition to execute a transfer operation between these registers. More specifically, microprocessor 120 of the present embodiment can select and execute one of two transfer operations according to a condition.

Embodiment 4

Figure 19:
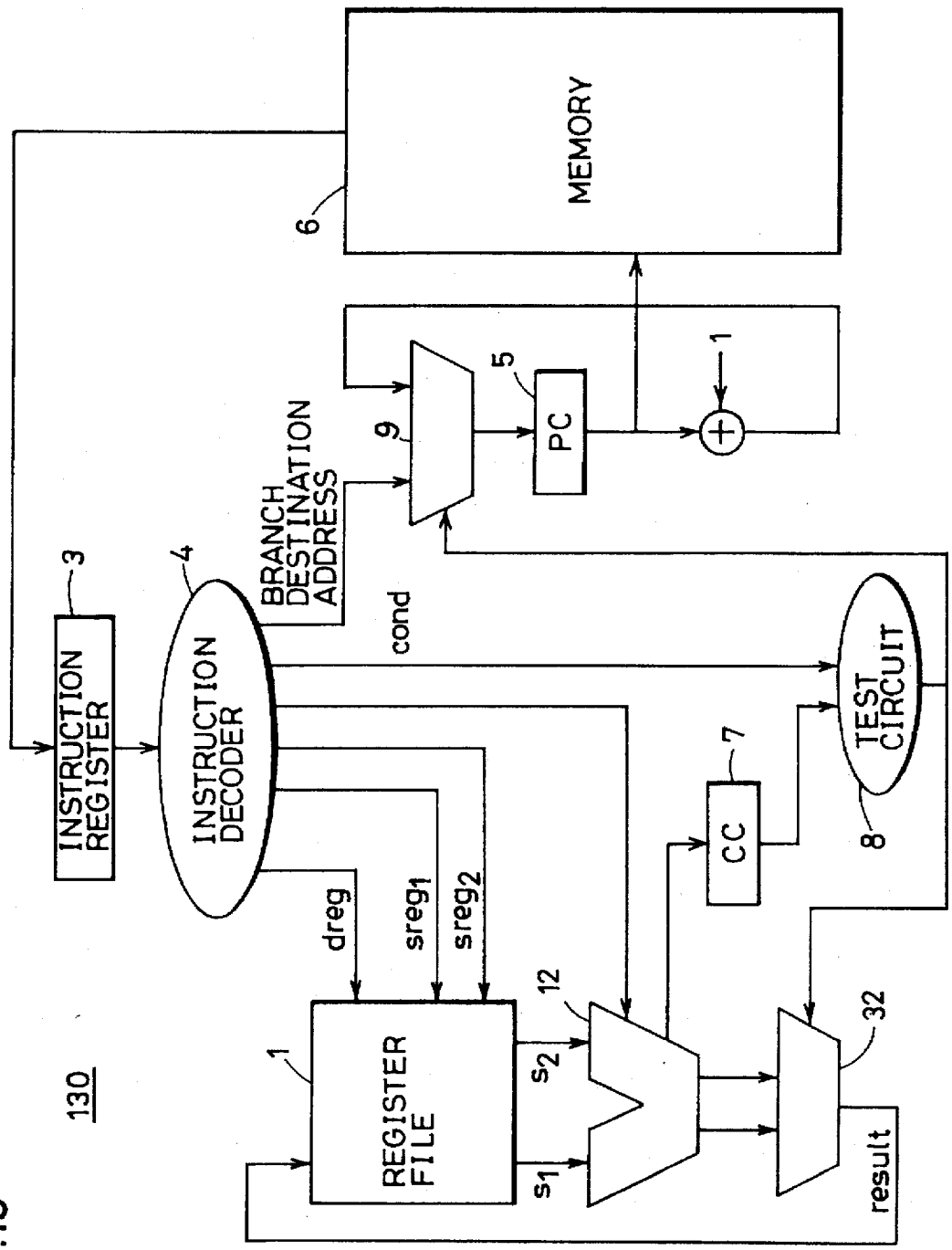
FIG. 19 shows a hardware structure of a microprocessor according to a third embodiment of the present invention.

Referring to FIG. 19, a microprocessor 130 according to a fourth embodiment of the present invention has a write register of a transfer operation fixed to a certain one in microprocessor 120 of FIG. 16. Selector 33 of microprocessor 120 of FIG. 16 is omitted in the present embodiment since it is not necessary to select a destination.

Since the write register is limited to one, microprocessor 130 cannot combine two transfer instructions having separate destinations into one instruction. However, microprocessor 130 of the present embodiment is advantageous in that the number of fields in an instruction code 55 used in the present microprocessor is fewer by 1 than instruction code 54 used in microprocessor 120. More specifically, instruction code 54 of FIG. 20 has fields dst1 and dst2 of FIG. 17 replaced with one field dst.

When the program of FIG. 18 is to be executed by the microprocessor of the present embodiment, the contents of each field in instruction code 55 is set as set forth in the following. A specific code representing an instruction for carrying out a transfer operation according to a condition is stored in field op. A code representing the register number of the destination register, i.e., 4, is stored in field dst. Codes representing the register numbers of the source registers, i.e., 1 and 2, are stored in fields src1 and src2. A code representing a condition, i.e. "<0", is stored in field cond.

Since microprocessor 130 of the present embodiment has the destination register fixed to one, the hardware structure and the format of instruction code 55 can be simplified in comparison with those of microprocessor 120 of FIG. 16.

Embodiment 5

Figure 21:
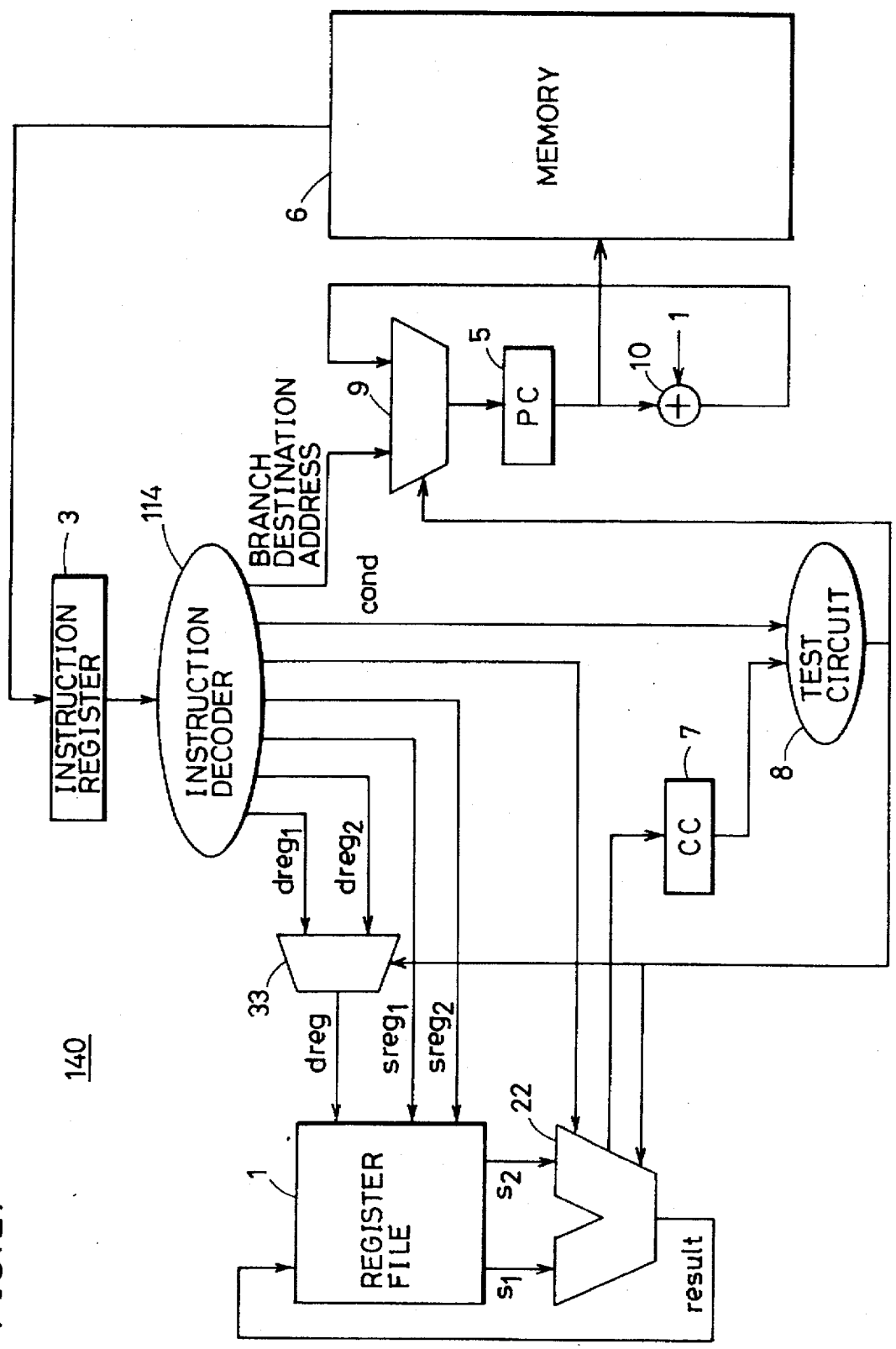
FIG. 21 shows a hardware structure of a microprocessor according to a fourth embodiment of the present invention.

Referring to FIG. 21, a microprocessor 140 according to fifth embodiment of the present invention has ALU 12 and selector 32 of microprocessor 120 of FIG. 16 replaced with an ALU 22.

ALU 22 responds to an output of condition test circuit 8 to select one of two inputs s1 and s2 which is output as the result. More specifically, when the output of condition test circuit 8 takes a value of 1 (true), selector 22 provides result=s1+0. When the output of condition test circuit 8 takes a value of 0 (false), selector 22 outputs result=s2+0.

For implementation, inputs y1 and y2 should follow the logic below, and should be applied to the conventional ALU 2 shown in FIG. 1 to be added.

TABLE 1

| Signal Indicating Conditional Transfer Operation | Output Value of Condition Test Circuit | y1 | y2 |
|---|---|---|---|
| 0 | X | s1 | s2 |
| 1 | 1 | s1 | 0 |
| 1 | 0 | 0 | s2 |

Therefore, y1=((signal indicating conditional transfer operation) ∪ (output value of condition test circuit)) ∩ s1 y2=((signal indicating conditional transfer operation) ∪ (output value of condition test circuit)) ∩ s2

Figure 22:
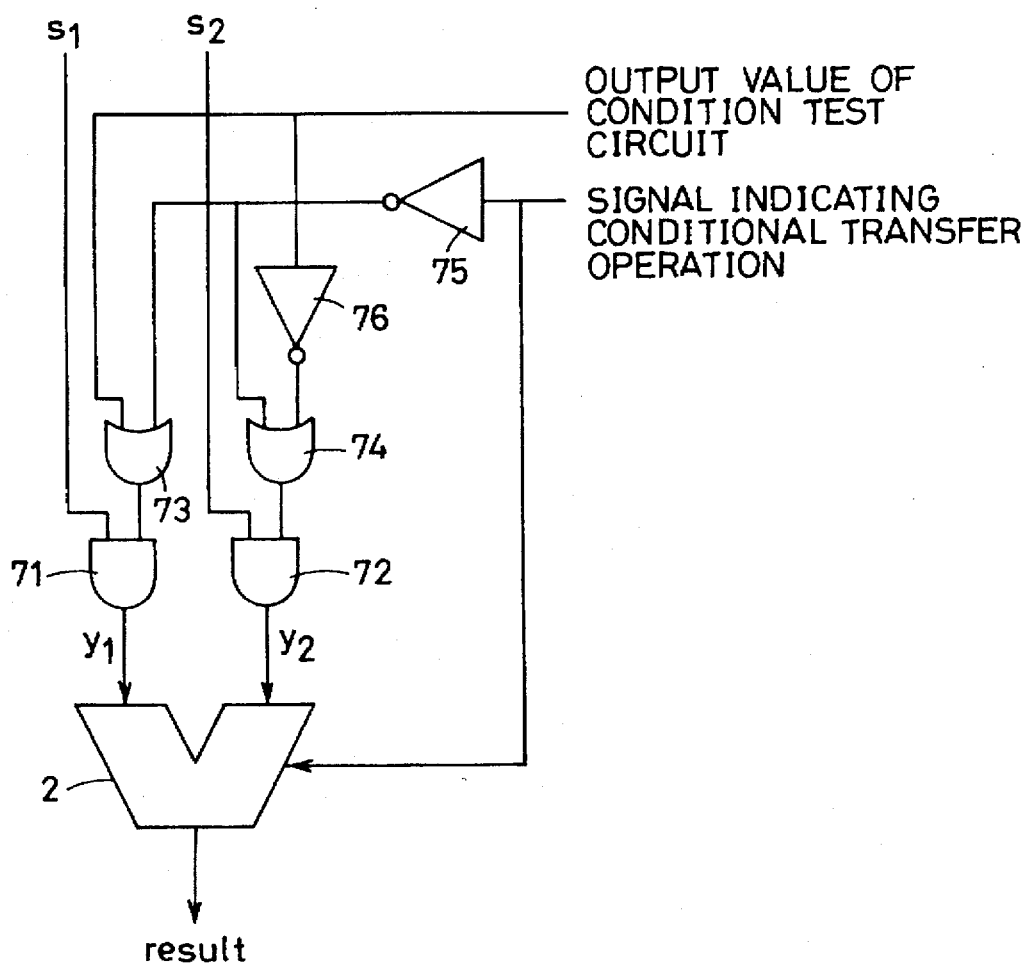
FIG. 22 shows a block diagram of a structure of an ALU of the microprocessor of FIG. 21.

FIG. 22 shows an example of a circuit diagram realizing this logic. Referring to FIG. 22, ALU 22 includes the conventional ALU 2 shown in FIG. 1 two AND gates 71 and 72, two OR gates 73 and 74, and two inverters 75 and 76.

OR gate 73 receives "an output value of condition test circuit 8" (referred to as "condition establish signal"), and "a signal indicating conditional transfer operation" which is inverted by inverter 75. OR gate 74 receives a condition establish signal inverted by inverter 76, and "a signal indicating conditional transfer operation" inverted by inverter 75. AND gate 71 receives data s1 from one source register, and an output of OR gate 73. AND gate 72 receives data s2 of the other source register, and an output of OR gate 74. ALU 2 receives outputs y1 and y2 of AND gates 71 and 72, respectively, to output the result to register file 1.

When the "signal indicating conditional transfer operation" is 0, the output of inverter gate 75 takes a value of 1, and the outputs or OR gates 73 and 74 take a value of 1. Therefore, AND gates 71 and 72 directly output data s1 and s2 from the source registers. When the "source instructing conditional transfer operation" is 1 and the condition establish signal is 1, the output of OR gate 73 takes a value of 1, and the output of OR gate 74 takes a value of 0. Therefore, AND gate 71 provides data s1 and AND gate 72 provides 0.

When the "signal instructing conditional transfer operation" is 1 and the condition establish signal is 0, the output of OR gate 73 takes a value of 0 and the output of OR gate 74 takes a value 1. Therefore, AND gate 72 directly outputs data s2, and AND gate 71 outputs 0.

ALU 2 carries out a general operation when the "signal indicating conditional transfer operation" is 0. ALU 2 adds the outputs y1 and y2 of AND gates 71 and 72 when the "signal indicating conditional transfer operation" is 1. Therefore, when the "signal indicating conditional transfer operation" is 1, ALU 2 takes an output of s1 and s2, respectively, depending upon whether the condition establish signal is 1 and 0, respectively.

In microprocessor 140 of the present embodiment, one of two transfer operations is selected to be executed according to a condition using an ALU 2 of a conventional microprocessor 100 with a slight addition of logic.

Thus, in a microprocessor according to an embodiment of the present invention, an instruction decoder outputs a multiple transfer control signal, and a plurality of pairs of source and destination designating signals. An ALU and peripheral circuitry transfers data of a plurality of source registers according to a plurality of source designating signals directly to a plurality of destination registers according to a plurality of destination designating signals. Therefore, a plurality of transfer operations can be executed at the same time. Particularly, a plurality of transfer operations generated by register renaming can be executed at one time to further improve the performance by register renaming.

According to a microprocessor of another embodiment of the present invention, an instruction decoder outputs a conditional transfer control signal, a plurality of pairs of source and destination designating signals, and a condition designating signal. An ALU and peripheral circuitry select one pair of source and destination designating signals to transfer the data of a source register according to the source designating signal to a destination register according to the destination designating signal. Therefore, one of a plurality of transfer operations can be selectively executed according to a condition.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. The microprocessor comprising:
   a register file including a plurality of register that can output data from a plurality of registers at one time and that can store separate data into a plurality of registers at one time,
   instruction decode means for decoding an instruction information and outputting a control signal for controlling an operation execution, said instruction decode means decoding a specific data transfer instruction and outputting a multiple transfer control signal indicating data transfer from a plurality of registers to a plurality of registers, source designating signals designating a plurality of source registers, and destination designating signals designating corresponding destination registers as a portion of said control signal, said register file responding to said source designating signal and providing data from corresponding plurality of registers, and operation means responsive to said control signal for executing an operation according to data stored in said register file and providing a result to registers in said register file, wherein said operation means responds to said multiple transfer control signal and provides data read out from the plurality of source registers specified according to said source designating signal to said register file, and wherein said register file stores data provided from said operation means into the plurality of destination registers specified according to said destination designating signals, wherein said specific data transfer instruction comprises a specific data transfer instruction code, a plurality of source register numbers, and one constant determined in advance so that the numbers of a plurality of destination registers can be obtained by carrying out a predetermined operation between each of the plurality of source register numbers and the one constant, and said instruction decode means carries out said predetermined operation on each of said plurality of source register numbers and said one constant to obtain said plurality of destination designating signals.

2. A microprocessor comprising:

a register file including a plurality of register that can output data from a plurality of registers at one time and that can store separate data into a plurality of registers at one time, instruction decode means for decoding an instruction information and outputting a control signal for controlling an operation execution, said instruction decode means decoding a specific data transfer instruction and outputting a multiple transfer control signal indicating data transfer from a plurality of registers to a plurality of registers, source designating signals designating a plurality of source registers, and destination designating signals designating corresponding destination registers as a portion of said control signal, said register file responding to said source designating signal and providing data from corresponding plurality of registers, and operation means responsive to said control signal for executing an operation according to data stored in said register file and providing a result to registers in said register file, wherein said operation means responds to said multiple transfer control signal and provides data read out from the plurality of source registers specified according to said source designating signal to said register file, and wherein said register file stores data provided from said operation means into the plurality of destination registers specified according to said destination designating signals, wherein said specific data transfer instruction comprises a specific data transfer instruction code, a plurality of destination register numbers, and one constant determined in advance so that the plurality of source register numbers are obtained by carrying out a predetermined operation between the plurality of source register numbers and the one constant, and said instruction decode means carries out said predetermined operation on each of said plurality of source register numbers and said one constant to obtain said plurality of source designating signals.

3. A microprocessor comprising:

a register file including a plurality of registers that can output data from a plurality of registers of a specified number at one time and that can store data into a register of a specified number;

instruction decode means for decoding an instruction information to output a control signal for controlling an operation execution, said instruction decode means decoding a specific data transfer instruction to output a transfer control signal indicating transfer of data from one of a plurality of source registers into a destination register, a source designating signal designating the plurality of source registers, a destination designating signal designating the destination register, and a transfer condition signal designating a condition determining a manner of data transfer as a portion of said control signal, said register file responding to said source designating signal to provide data from corresponding plurality of registers;

operation means responsive to said control signal for executing an operation according to data stored in said register file to provide a result thereof to a register of said register file, and for providing a condition code of said operation execution; and condition determining means for comparing a condition code output from said operation means with said transfer condition signal and making determination whether said condition determining the manner of data transfer is met or not to generate a condition establish signal, wherein said operation means responds to said transfer control signal and said condition establish signal to select one data read out from the plurality of source registers according to said source designating signal in co-operation to provide the selected data to said register file, wherein said register file stores data provided from said operation means into a destination register according to said destination designating signal, said register file can output data from first and second source registers at one time, said operation means comprises an ALU having first and second inputs for receiving data outputs from said register file, and first and second outputs, responsive to said control signal for carrying out an operation determined by said control signal on data at said first input and data at said second input to output a result thereof, wherein said ALU responds to said transfer control signal for providing data at said first input to said first output and data at said second input to said second output, said operation means further comprises first selecting means responsive to said condition establish signal for selecting and providing to said register file one of said first and second outputs of said ALU, said specific data transfer instruction includes a specific data transfer instruction code, the numbers of two source registers, the numbers of two destination registers, and a condition determining a manner of data transfer, said instruction decode means comprises an instruction decoder for decoding said specific data transfer instruction to provide to said register file said source designating signal designating the numbers of the two source registers, and for providing two said destination designating signals designating the numbers of the two destination registers, and second selecting means receiving said destination designating signal from said instruction decoder, responsive to said condition establish signal for selecting and providing to said register file one of said two destination designating signals.

4. A microprocessor comprising:

a register file including a plurality of registers that can output data from a plurality of registers of a specified number at one time and that can store data into a register of a specified number;

instruction decode means for decoding an instruction information to output a control signal for controlling an operation execution, said instruction decode means decoding a specific data transfer instruction to output a transfer control signal indicating transfer of data from one of a plurality of source registers into a destination register, a source designating signal designating the plurality of source registers, a destination designating signal designating the destination register, and a transfer condition signal designating a condition determining a manner of data transfer as a portion of said control signal, said register file responding to said source designating signal to provide data from corresponding plurality of registers;

operation means responsive to said control signal for executing an operation according to data stored in said register file to provide a result thereof to a register of said register file, and for providing a condition code of said operation execution; and condition determining means for comparing a condition code output from said operation means with said transfer condition signal and making determination whether said condition determining the manner of data transfer is met or not to generate a condition establish signal, wherein said operation means responds to said transfer control signal and said condition establish signal to select one data read out from the plurality of source registers according to said source designating signal in co-operation to provide the selected data to said register file, wherein said register file stores data provided from said operation means into a destination register according to said destination designating signal, said register file can output data from first and second source registers at one time, said operation means comprises an ALU having first and second inputs receiving data output from said register file, and first and second outputs, responsive to said control signal for carrying out an operation determined by said control signal on data at said first input and data at said second input to output a result thereof, said ALU responds to said transfer control signal for providing data at said first input to said first output and data at said second input to said second output, said operation means further comprises first select means responsive to said condition establish signal for selecting and providing to said register file one of said first and second outputs of said ALU, said specific data transfer instruction comprises a specific data transfer instruction code, the numbers of two source registers, the number of one destination register, and a condition determining a manner of data transfer, and said instruction decode means decodes said specific data transfer instruction to provide two source designating signals specifying the numbers of two source registers to said register file, and to output and provide to said register file a destination designating signal specifying the number of one destination register.

* * * * *

UNITED STATES PATENT AND TRADEMARK OFFICE
CERTIFICATE OF CORRECTION

PATENT NO.   : 5,684,983
DATED        : November 4, 1997
INVENTOR(S)  : Hideki ANDO It is certified that error appears in the above-indentified patent and that said Letters Patent is hereby corrected as shown below:

On the title page, item [54], and col. 1, last line of the title, after "REGISTER" insert --NUMBERS--.

Signed and Sealed this

Twenty-fourth Day of March, 1998

Attest:

BRUCE LEHMAN

Attesting Officer

Commissioner of Patents and Trademarks